US012453286B2

(12) United States Patent
Hughes et al.

(10) Patent No.: US 12,453,286 B2
(45) Date of Patent: Oct. 21, 2025

(54) METHOD FOR MANUFACTURING AN ULTRASOUND TRANSDUCER

(71) Applicant: NOVOSOUND LTD, Edinburgh (GB)

(72) Inventors: David Hughes, Paisley (GB); David Hutson, Paisley (GB)

(73) Assignee: NOVOSOUND LTD, Edinburgh (GB)

( * ) Notice: Subject to any disclaimer, the term of this patent is extended or adjusted under 35 U.S.C. 154(b) by 919 days.

(21) Appl. No.: 16/349,028

(22) PCT Filed: Nov. 10, 2017

(86) PCT No.: PCT/GB2017/053394
§ 371 (c)(1),
(2) Date: May 10, 2019

(87) PCT Pub. No.: WO2018/087560
PCT Pub. Date: May 17, 2018

(65) Prior Publication Data
US 2019/0283082 A1 Sep. 19, 2019

(30) Foreign Application Priority Data

Nov. 11, 2016 (GB) ..................... 1619108

(51) Int. Cl.
*H10N 30/07* (2023.01)
*H10N 30/00* (2023.01)
(Continued)

(52) U.S. Cl.
CPC ............. *H10N 30/06* (2023.02); *H10N 30/07* (2023.02); *H10N 30/074* (2023.02);
(Continued)

(58) Field of Classification Search
CPC ... H01L 41/314; H01L 41/316; H01L 41/317; H01L 41/338; H01L 41/047; H01L 41/29;
(Continued)

(56) References Cited

U.S. PATENT DOCUMENTS

| 4,174,421 A | 11/1979 | Nishiyama et al. |
| 4,782,469 A | 11/1988 | Granz et al. |

(Continued)

FOREIGN PATENT DOCUMENTS

| CN | 1565078 A | 1/2005 |
| CN | 101712028 A | 5/2010 |

(Continued)

OTHER PUBLICATIONS

R. J. Kline-Schoder, D. B. Kynor, M. D. Jaeger, A. A. Winder and C. Desilets, "Fabrication of high frequency ultrasonic transducer arrays using physical vapor deposition [for in vivo imaging]," Proceedings of the IEEE 25th Annual Northeast Bioengineering Conference), 1999, pp. 87-91 (Year: 1999).*

(Continued)

*Primary Examiner* — A. Dexter Tugbang
(74) *Attorney, Agent, or Firm* — Alston & Bird

(57) ABSTRACT

A method for producing a plurality of piezoelectric ultrasound transducer elements, the method comprising providing or depositing a piezoelectric material on at least part of a surface of a sheet of substrate to form a layered member; and forming the one or more piezoelectric ultrasound transducer elements from the layered member.

3 Claims, 11 Drawing Sheets

(51) Int. Cl.
*H10N 30/06* (2023.01)
*H10N 30/074* (2023.01)
*H10N 30/076* (2023.01)
*H10N 30/088* (2023.01)
*H10N 30/093* (2023.01)
*B06B 1/02* (2006.01)
*B06B 1/06* (2006.01)
*B81B 3/00* (2006.01)
*H10N 30/20* (2023.01)
*H10N 30/853* (2023.01)
*H10N 30/87* (2023.01)

(52) U.S. Cl.
CPC ......... *H10N 30/076* (2023.02); *H10N 30/088* (2023.02); *H10N 30/093* (2023.02); *H10N 30/706* (2024.05); *B06B 1/0207* (2013.01); *B06B 1/06* (2013.01); *B06B 1/0688* (2013.01); *B06B 2201/76* (2013.01); *B81B 3/0021* (2013.01); *B81B 2201/02* (2013.01); *H10N 30/2047* (2023.02); *H10N 30/853* (2023.02); *H10N 30/87* (2023.02); *Y10T 29/42* (2015.01)

(58) Field of Classification Search
CPC ..... H01L 41/081; H01L 41/187; H01L 41/31; Y10T 29/42; B06B 1/06; B06B 1/0688; B06B 1/0207; B06B 1/0021; B06B 2201/02; B06B 2201/76; B06B 1/0622; H10N 30/07; H10N 30/093; H10N 30/2047; H10N 30/853; H10N 30/074; H10N 30/076; H10N 30/077
See application file for complete search history.

(56) References Cited

U.S. PATENT DOCUMENTS

| | | | |
|---|---|---|---|
| 5,163,209 A * | 11/1992 | Harada | Y10T 29/42 29/25.35 |
| 6,400,065 B1 | 6/2002 | Toda et al. | |
| 9,070,861 B2 | 6/2015 | Bibl et al. | |
| 2004/0164650 A1 | 8/2004 | Xu et al. | |
| 2006/0131680 A1 | 6/2006 | Akiyama et al. | |
| 2007/0097181 A1 * | 5/2007 | Fujii | H10N 30/2047 347/68 |
| 2007/0108866 A1 | 5/2007 | Conley et al. | |
| 2008/0211880 A1 * | 9/2008 | Hara | H10N 30/076 204/192.18 |
| 2008/0238261 A1 * | 10/2008 | Ohashi | H10N 30/2047 310/340 |
| 2008/0296529 A1 | 12/2008 | Akiyama et al. | |
| 2010/0125988 A1 * | 5/2010 | Nakamura | H01L 41/332 29/25.35 |
| 2010/0148627 A1 | 6/2010 | Funasaka et al. | |
| 2011/0198970 A1 * | 8/2011 | Martin | Y10T 29/42 29/25.35 |
| 2012/0016243 A1 | 1/2012 | Brown et al. | |
| 2012/0153778 A1 * | 6/2012 | Jun | Y10T 29/42 29/25.35 |
| 2012/0206014 A1 * | 8/2012 | Bibl | B06B 1/0622 310/330 |
| 2013/0018266 A1 * | 1/2013 | Nishikubo | Y10T 29/42 29/25.35 |
| 2013/0127300 A1 | 5/2013 | Umeda et al. | |
| 2014/0066778 A1 | 3/2014 | Nishiwaki | |
| 2014/0139072 A1 * | 5/2014 | Sudol | H01L 41/29 29/25.35 |
| 2014/0167560 A1 | 6/2014 | Onda | |
| 2014/0167563 A1 | 6/2014 | Park et al. | |
| 2015/0097468 A1 * | 4/2015 | Hajati | B06B 1/0622 310/334 |
| 2015/0179922 A1 | 6/2015 | Kim et al. | |
| 2015/0271606 A1 | 9/2015 | Grosh et al. | |
| 2015/0367586 A1 | 12/2015 | Georgeson et al. | |
| 2016/0181952 A1 | 6/2016 | Kim et al. | |

FOREIGN PATENT DOCUMENTS

| | | | |
|---|---|---|---|
| CN | 103493510 A | | 1/2014 |
| CN | 103654848 A | | 3/2014 |
| CN | 110191765 A | | 8/2019 |
| EP | 0084174 A2 | | 7/1983 |
| EP | 0176030 A2 | | 4/1986 |
| EP | 0420190 A2 | | 4/1991 |
| EP | 1174525 A2 | | 1/2002 |
| EP | 1311006 A1 | | 5/2003 |
| EP | 2679167 A1 | | 1/2014 |
| EP | 2693773 A1 | | 2/2014 |
| EP | 2858241 A1 | | 4/2015 |
| EP | 3007242 A1 | | 4/2016 |
| FR | 2439985 A1 | | 5/1980 |
| GB | 2405257 A | | 2/2005 |
| JP | 08-033097 A | | 2/1996 |
| JP | 2012-239928 A | | 12/2012 |
| JP | 2019114953 A | * | 7/2019 |
| WO | WO 96/25244 A1 | | 8/1996 |
| WO | WO-2006/003398 A1 | | 1/2006 |
| WO | WO 2011/073414 A2 | | 6/2011 |
| WO | WO-2016/008690 A1 | | 1/2016 |
| WO | WO 2016/104396 A1 | | 6/2016 |

OTHER PUBLICATIONS

International Searching Authority, International Search Report and Written Opinion for International Application No. PCT/GB2017/053394, dated Apr. 10, 2018, 15 pages, The Netherlands.
United Kingdom Intellectual Property Office, United Kingdom Search Report for Great Britain Application No. GB1619108.2, dated Feb. 9, 2017, 5 pages, Great Britain.
United Kingdom Intellectual Property Office, United Kingdom Search Report for Great Britain Application No. GB1619108.2, dated Jul. 7, 2017, 3 pages, Great Britain.
United Kingdom Intellectual Property Office, United Kingdom Search Report for Great Britain Application No. GB1619108.2, dated Jul. 10, 2017, 2 pages, Great Britain.
China National Intellectual Property Administration, Third Office Action, including Search Report, received for Application No. 201780083207.1, dated Dec. 15, 2021, 12 pages, P.R.C.
Korean Intellectual Property Office, Notification of Reason for Refusal received for Application No. 10-2019-7016489, dated Mar. 17, 2022, 17 pages, South Korea.
China National Intellectual Property Administration, First Office Action, including Search Report, received for Application No. 201780083207.1, dated Jul. 21, 2020, 11 pages, P.R.C.
European Patent Office, Office Action received for Application No. 17798295.6, dated Jan. 12, 2020, 12 pages, Netherlands.
Yang, Hong Jun, et al., "Application and Inspection of Special Components", May 2010, p. 108, China Electric Power Press, PRC.
China National Intellectual Property Administration, Second Office Action for Chinese Patent Application No. 201780083207.1, dated May 7, 2021, (11 pages), Beijing, China.

* cited by examiner

Thickness Mode
Circuit Equivalent

Off Resonance
Circuit Equivalent

METHOD FOR MANUFACTURING AN ULTRASOUND TRANSDUCER

CROSS REFERENCE TO RELATED APPLICATIONS

This application is a National Stage Application, filed under 35 U.S.C. § 371, of International Application No. PCT/GB2017/053394, filed Nov. 10, 2017, which International Application claims priority to and the benefit of United Kingdom Application No. 1619108.2, filed Nov. 11, 2016; the contents of both of which as are hereby incorporated by reference in their entirety.

BACKGROUND

Related Field

The present invention relates to an ultrasound transducer apparatus and associated system and method.

Description of Related Art

Analysis using ultrasound waves shows great promise in a range of applications, particularly in imaging such as medical imaging but also in fields such as non-destructive testing (NDT), particularly in industrial NDT. Dental imaging using ultrasonic techniques is one example of a suitable application, wherein the ultrasound imaging can be used to determine properties of the layers of the tooth, e.g. of the enamel, dentine and pulp, and determine and characterise the thickness of the layers and any defect, disease or other issues therein.

The ultrasound transducer is operable to produce ultrasonic waves that are transmitted into the sample (e.g. a tooth or hard material) and detect reflections of the ultrasonic waves that are reflected from the interfaces between the layers of the sample (e.g. the interfaces between the enamel and dentine or between the dentine and pulp). By using techniques such as time of flight and other analyses, it is possible to image the layers of the sample (e.g. tooth) and thereby characterise the sample. Application of ultrasound in this application is particularly advantageous, as traditional techniques of imaging teeth involve the use of x-rays, which are potentially harmful to both the recipient and the medical practitioner administering the radiation and require secure, expensive and time-consuming control of radioactive substances.

Conventional ultrasonic transducers are generally formed from bulk ceramic materials, which can be high cost, bulky and difficult to manufacture, particularly with the shapes and properties desired for many applications.

At least one aspect of at least one embodiment of the present invention is to provide an improved ultrasound transducer and associated system and/or improved imaging or testing method, particularly a medical imaging method and most particularly a dental imaging method or alternatively industrial non-destructive testing methods.

BRIEF SUMMARY

According to a first aspect of the present invention there is provided a method of producing one or more (preferably a plurality of) piezoelectric members or elements, such as ultrasound transducer elements. The method may comprise providing or depositing a piezoelectric material on at least part of a substrate, e.g. a sheet of substrate, for example to form a layered member. The piezoelectric material may be arranged or deposited on at least the part of the substrate so as to cover at least some, a majority or all of a surface of the substrate (e.g. the sheet of substrate). The one or more piezoelectric members or elements, such as ultrasound transducer members or elements may be formed from the layered member, e.g. the substrate (e.g. the sheet of substrate) with the piezoelectric material provided or deposited thereon.

The method may comprise providing or depositing a layer of dielectric material, e.g. onto the piezoelectric material or substrate. The dielectric material may be provided or deposited onto at least part or all of a surface, e.g. another or an opposite side or surface, of the dielectric material to the substrate. The dielectric material may be polymeric, a plastic, or an epoxy such as SU8. The dielectric material may have a thickness less than 1 mm. The dielectric material may have a high voltage density. The dielectric material may be an electrical insulator.

The method may comprise one or more of: cutting, stamping, releasing and/or otherwise forming one or preferably a plurality of shaped portions from the layered member, e.g. the substrate (e.g. the sheet of substrate) with the piezoelectric material provided or deposited thereon. The shaped portions may be or form the transducer elements or may be or form blanks for producing the transducer elements therefrom.

The shaped portions (e.g. the transducer elements or blanks) may comprise an active part and at least one tab protruding from the active part. The active part may be adapted to produce ultrasonic waves, in use. The tab may be adapted for use as an electrical connector or electrode. The active part may be at least partly circular (other than the interface with the tab), oval, a quadrilateral such as a square or rectangle, or other suitably shaped portion. The method may comprise bending the tab relative to the active part, so that the tab is angled, e.g. at least 45°, at least 60°, or perpendicular to the active part. The tab may be bent so that the tab is bent towards the surface of the layered member formed by the piezoelectric material, e.g. away from the surface of the layered member formed by the piezoelectric material.

In this way, the resulting piezoelectric member or element may comprise an active part and a tab angled to the active part.

A plurality, e.g. a large number, of such piezoelectric members or elements may be produced from a single sheet of piezoelectric material deposited onto a substrate. The piezo electric members or elements may be or form the transducer elements or may be or form blanks or components that may be used to produce the transducer elements. In this way, a number of piezoelectric members or elements may be produced, e.g. using a sheet deposition and cutting or stamping process, wherein the piezoelectric members or elements can then subsequently be assembled into transducers. In this way, the present method may involve production of a plurality or even many transducer members or elements using a single deposition step. This results in a cheaper and easier to produce transducer and allows increased production rates. This contrasts to approaches in which piezoelectric material is individually deposited to form individual transducers or where single crystals are grown and the single crystals used for individual transducers. The growth of single crystals can be time consuming. Additionally, the formation of individual transducers using single crystals may be difficult as single crystals are difficult to cut to a size and/or angle required, for example, for the formation of high frequency transducers. The use of single crystals in the formation of individual transducers may result a large amounts of wastage and may lead to difficulties in fabrication in general.

According to a second aspect of the present invention is a method of assembling an ultrasound transducer. The method may comprise providing or forming a transducer element. The transducer element may be formed using the method of the first aspect. The method may comprise arranging or depositing a piezoelectric material on at least part of a substrate, e.g. to at least partly form the transducer element. The substrate may be configured or arranged to provide a first electrode or electrical connector of the ultrasound transducer. The method may comprise connecting at least one second electrode or electrical connector to the transducer element, e.g. to the piezoelectric material.

The substrate may be configured or arranged to provide a first electrode or electrical connector of the ultrasound transducer. The method may comprise connecting at least one second electrode or electrical connector to the transducer element, e.g. to the piezoelectric material.

A lateral extent or surface area (or a combined lateral extent or surface area) of the at least one second electrode may be less than a lateral extent or surface area of the piezoelectric material. A surface area (e.g. total or combined surface area) of a connection region or connection regions of the one or more second electrodes that contact, couple or bond to or support the transducer element may be less or substantially less than the surface area of the transducer element (or of the piezoelectric material thereof).

The transducer element may be supported, coupled, bonded or contacted at discrete or spaced apart contact regions or parts of its surface (e.g. the surface of the piezoelectric material). The transducer element may be supported, coupled, bonded or contacted by one or more supporting structures of the ultrasound transducer over only some but not all of the surface of the transducer element (e.g. the surface of the piezoelectric material).

The method may comprise connecting a plurality of second electrodes or electrical contacts to the transducer element, e.g. to the piezoelectric material. A lateral extent or surface area of each second electrode or the total or combined lateral extent or surface area of the plurality of second electrodes may be less than the lateral extent or surface area of the transducer element, e.g. of the piezoelectric material.

The method may comprise forming or shaping the transducer element, e.g. the substrate and/or the piezoelectric material, prior to connecting the second electrode or electrical connector to the transducer element, e.g. to the piezoelectric material.

For example, the transducer element may be or comprise or be formed from a portion of a sheet of the substrate and/or piezoelectric material. The method may comprise cutting and/or releasing the portion of the substrate and/or piezoelectric material from a sheet of substrate and/or piezoelectric material.

The method comprises arranging a further backing element on the piezoelectric material.

The method may comprise arranging at least one of the substrate, the piezoelectric material, the/each second electrode or the plurality of second electrodes and the further backing element in a housing.

The method may comprise arranging at least a portion of a delay material in the housing. At least a portion of the delay material may be arranged between an engagement element of the housing and the substrate. The delay material may be configured to introduce a time delay between ultrasound waves received by the apparatus and ultrasound waves generated by the apparatus.

According to a third aspect of the present invention there is provided a method of assembling an ultrasound transducer. The method may comprise providing a substrate. The method may comprise providing a piezoelectric material. The piezoelectric material may be arranged or deposited on at least part of the substrate. The substrate may be configured or arranged to form a first electrode or electrical connector of the ultrasound transducer. The method may comprise connecting a second electrode or electrical connector to the piezoelectric material. A lateral extent or surface area of the second electrode or electrical connector may be less than a lateral extent or surface area of the piezoelectric material.

According to a fourth aspect of the present invention there is provided an ultrasound transducer for imaging an object. The ultrasound transducer may be suitable for biomedical imaging of an object. The ultrasound transducer may find utility in dental applications. For example, the ultrasound transducer may be suitable for imaging of a dental structure, e.g. a tooth structure. The ultrasound transducer may be configured for use in non-destructive testing.

The ultrasound transducer may comprise a transducer element, which may be or comprise a planar, thin-film or layered transducer element. The transducer element may comprise a substrate, such as a non-piezoelectric substrate. The substrate may be a flexible substrate. The substrate may be a thin and/or free-standing substrate. The substrate may optionally but not essentially be or comprise a film or foil. The substrate may be an electrically conductive substrate. The substrate may be configured or arranged to form a first electrode or electrical connector of the ultrasound transducer, or may be electrically connected to a first electrode or electrical connector.

The transducer element may comprise a piezoelectric material. The piezoelectric material may be arranged or deposited on at least part or all of the substrate. The substrate and the piezoelectric material may be, form, comprise or be comprised in layers of the layered transducer element.

The transducer element may comprise a dielectric material, such as a layer of dielectric material. The piezoelectric material may be deposited or provided on the piezoelectric material. The dielectric material may be provided or deposited onto at least part or all of a side or surface of the dielectric material, e.g. another or an opposite side or surface of the dielectric material to the substrate. The dielectric material may be provided or deposited on an outer or outward surface of the transducer. The dielectric material may be polymeric, a plastic, or an epoxy such as SUB. The dielectric material may have a thickness less than 1 mm. The dielectric material may have a high voltage density. The dielectric material may be an electrical insulator.

The transducer element may be at least partly produced by the method of the first aspect. The ultrasound transducer may be at least partly assembled using the method of the second or third aspect.

The ultrasound transducer may comprise one or more second electrodes or electrical connectors. The one or more second electrodes or electrical connectors may be connected, coupled or bonded to the transducer element, e.g. to the piezoelectric material. For example, the one or more second electrodes or electrical connectors may be connected, coupled or bonded to the transducer element (e.g. the piezoelectric material) by a bonding material, e.g. a conductive epoxy or other conductive bonding material. The one or more second electrodes or electrical connectors may be configured to at least partially support the transducer element.

A surface area (e.g. total or combined surface area) of a connection region or connection regions of the one or more second electrodes that contact, couple or bond to or support the transducer element may be less than the surface area of the transducer element (or of the piezoelectric material thereof). In other words, a lateral extent or contact area (e.g. a total lateral extent or contact area) of the one or more second electrodes or electrical connectors may be less than a lateral extent or surface area of the transducer element. By providing a second electrode or electrical contact having a lateral extent or surface area less than that of the surface of the transducer element supported or contacted by, or bonded or coupled to, the second electrode or electrical contact, the bonding or connection of the second electrode to the transducer element may be facilitated. Furthermore, the production of ultrasound by the transducer element may be improved. Additionally or alternatively, this may allow a plurality of second electrodes to be connected to the transducer element, for example to allow focusing of one or more ultrasound wave(s) emitted by the ultrasound transducer, e.g. in use.

The transducer element may be supported, coupled, bonded or contacted only at discrete or spaced apart contact regions or parts of its surface (e.g. the surface of the piezoelectric material). The transducer element may be supported, coupled, bonded or contacted by one or more supporting structures of the ultrasound transducer over only some but not all of the surface of the transducer element (e.g. the surface of the piezoelectric material).

The ultrasound transducer may comprise a housing, e.g. a housing for receiving, supporting and/or mounting at least one of the transducer element, the substrate, the piezoelectric material, the/each second electrode or the plurality of second electrodes and a further backing element. The housing or parts thereof may be made of ceramic, plastic and/or polymer. Alternatively or additionally, the housing or parts thereof may be made of metal or a metal alloy. The housing may define an opening, e.g. in an end of the housing. The transducer element may be mounted or bonded to the housing, e.g. to the end of the housing or to the periphery around the opening. The transducer element may be suspended over the opening in the housing, e.g. to cover and/or close the opening in the housing. The housing may define a cavity, chamber or bore in communication with the opening. The one or more second electrodes or electrical connectors may be at least partially disposed within the cavity, chamber or bore in the housing.

The cavity, chamber or bore of the housing may provided with or filled with a filler, such as a gel or resin. The filler may be configured to have no or negligible effect on the response of the piezoelectric material.

The ultrasound transducer may be arranged such that the transducer element is supported by the housing and/or the one or more second electrodes or electrical connectors and/or the filler material. The support structures of the ultrasound transducer referred to above may be or comprise the housing and the one or more second electrodes or electrical connectors.

The second electrode or electrical connector may be or comprise a pin or an elongate electrode or electrical connector. The second electrode or electrical connector may comprise a shaft and may comprise a head that may extend generally perpendicular or be angled to the shaft. The second electrode may comprise or form a backing element.

The second electrical connector may be connected to a backing element. The second electrode or electrical connector and/or backing element may be configured to damp ultrasound waves generated by the piezoelectric material. This may lead to a reduction of excessive vibration and allow a spatial ultrasound pulse length to be reduced, which may lead to an improved resolution of the ultrasound transducer.

The one or more second electrodes or electrical connectors may be arranged on the transducer element (e.g. the piezoelectric material of the transducer element) such that at least part of the second electrode or electrical connector (e.g. a shaft of the second electrode or electrical connector) extends in a direction substantially perpendicular to a surface of the piezoelectric material. At least part of the second electrode or electrical connector (e.g. the head) may extend along or in parallel with the surface of the transducer element. The head of the second electrode or electrical connector may be bonded to the transducer element (e.g. to the piezoelectric material or to the backing element).

The ultrasound transducer may comprise a plurality of second electrodes or electrical connectors. The plurality of second electrodes or electrical connectors, or each second electrode or electrical connector, may be connected or bonded to the transducer element (e.g. to the piezoelectric material). The total (e.g. combined) lateral extent or surface area of the plurality of second electrodes or electrical connectors may be less than a lateral extent or surface area of the transducer element (e.g. of the piezoelectric material). The plurality of second electrodes or electrical connectors may comprise or define an array of second electrodes or electrical connectors. By connecting a plurality of second electrodes or electrical connectors on the transducer element (e.g. on the piezoelectric material thereof) focusing of one or more ultrasound wave(s) emitted by the ultrasound transducer may be improved.

The ultrasound transducer may comprise a further backing element. The backing element or further backing element may form one or more layers of the transducer element. The further backing element may be configured to allow for damping of ultrasound waves generated by the piezoelectric material. By providing a further backing element, a reduction of excessive vibration may be improved, which may allow a spatial ultrasound pulse length to be reduced and/or may lead to an improved resolution of the ultrasound transducer.

The further backing element may be arranged on the piezoelectric material. For example, the further backing element may be arranged on the piezoelectric material such that the further backing element supports the substrate and the piezoelectric material. The further backing element may be arranged on the piezoelectric material such that the backing element surrounds the/each second electrode or electrical connectors, or the plurality of second electrodes or electrical connectors. The further backing element may be arranged on the piezoelectric material so that the backing element and the second electrode or the plurality of second electrodes are coaxially arranged relative to each other.

The further backing element may comprise a thermally insulating material. The thermally insulating material of the further backing element may allow the backing element to act as a heat shield.

The ultrasound transducer may comprise an engagement element, e.g. an engagement for engaging or contacting an object to be imaged. The engagement element may comprise a membrane. The engagement element may be flexible or conformable. The engagement element may be polymeric, e.g. it may be or comprise a polymeric film. The engagement element may be transparent to one or more ultrasound wave(s). The engagement element may be arranged on an end of the housing or on a secondary housing. For example, the engagement element may be arranged to span the end of the housing or secondary housing. For example, the secondary housing may be movable or slidably mounted on the housing and configured to be movable or slidable relative thereto.

At least one of the transducer element, the/each second electrode or the plurality of second electrodes and the backing element may be moveably or slidably arranged in the housing or relative to the second housing, e.g. to allow a distance between the engagement element and the transducer element to be varied or adjusted.

The ultrasound transducer may comprise a damping material. At least one portion of the damping material may be arranged in the housing, in the secondary housing or in a chamber or volume defined between the housing and the secondary housing. For example, at least one portion of the damping material may be arranged between the engagement element and the transducer element (e.g. the substrate of the transducer element). The damping material may be configured to reduce or vary a velocity of one or more ultrasound wave(s) received by the ultrasound transducer. The damping material may be configured to introduce a time delay between generation of an ultrasonic wave by the transducer element and emission of the ultrasonic wave from the ultrasound transducer. The damping material may be configured to allow discrimination between, e.g. to introduce a time delay between, one or more ultrasound wave(s) generated by the ultrasound transducer and one or more ultrasound wave(s) received by the ultrasound transducer, e.g. one or more ultrasound wave(s) reflected by the object to be imaged. The material may be configured or provided to act as a delay line. The material may be or comprise a conformable material, e.g. an epoxy or gel-type material. This may allow a thickness of the material and thus, a thickness of the delay line, to be varied, for example, when the transducer element is slid or moved relative to the engagement element.

The ultrasound transducer may be configured to emit one or more ultrasound wave(s) at a frequency in the region of 0.001 to 200 MHz, e.g. 40 to 120 MHz (e.g. for use in dental applications) or 1 to 10 MHz (e.g. for use in NDT applications). The transducer element may be configured and/or arranged such that the ultrasound transducer emits one or more ultrasound wave(s) comprising a frequency of 0.001 to 200 MHz, e.g. about 40 to 120 MHz, in use. The piezoelectric material may have a thickness of about 2 to 8 µm. The substrate may have a thickness of about 15 to 60 µm.

The substrate may be or comprise a metal substrate, e.g. a metal foil. The substrate may be or comprise a flexible and/or conductive substrate. A flexible substrate may allow the transducer element, e.g. the substrate and/or piezoelectric material to be shaped, non-planar or curved, e.g. to allow for focusing of one or more ultrasound wave(s). The substrate may be or comprise an Aluminium or Copper substrate.

The piezoelectric material may be or comprise an inorganic material. The piezoelectric material may be or comprise a crystalline or polycrystalline material. The piezoelectric material may be non-polymeric. The piezoelectric material may be or comprise a continuous layer of material having piezoelectric properties, e.g. the piezoelectric material may not comprise discrete domains of piezoelectric material having piezoelectric properties within a matrix of non-piezoelectric material. The piezoelectric material may be or comprise Zinc Oxide (ZnO) or Aluminium Nitride (AlN).

According to a fifth aspect of the present invention there is provided an apparatus for interfacing with an ultrasound transducer, such as the ultrasound transducer of the fourth aspect. The apparatus may be connected, coupled or connectable or couplable to the ultrasound transducer. The apparatus may be connected, coupled or connectable or couplable to a source for excitation of the ultrasound transducer and a receiver for receiving a signal from the ultrasound transducer. The apparatus may be connected, coupled or connectable or couplable between the ultrasound transceiver and the source and receiver.

The apparatus may be configured to adjust or select an electrical property (e.g. impedance) of the apparatus so that the corresponding electrical property (e.g. impedance) of the ultrasound transducer matches or corresponds to the corresponding electrical property of a source for excitation of the ultrasound transducer or a receiver for receiving a signal from the ultrasound transducer. The electrical property may be or comprise impedance.

The apparatus may comprise a first configuration. In the first configuration, the apparatus may be configured to adjust or select the impedance of the apparatus to provide impedance matching between the impedance of the transducer and the impedance of the receiver.

The apparatus may comprise a second configuration. In the second configuration, the apparatus may be configured to adjust or select the impedance of the apparatus to provide impedance matching between the impedance of the transducer and the impedance of the source.

The apparatus may be configured to be switchable or operable between the first configuration and the second configuration. The apparatus may comprise a switch member, e.g. a gate or gate circuit. The switch member may be configured to operate or switch the apparatus between the first and second configuration.

The apparatus may comprise a first adjustment system. The first adjustment system may be or comprise an impedance or impedance network. The first adjustment system may be comprised in, or connectable or connected to, the switch member. The first adjustment system may be configured to provide the electrical property of the apparatus so as to correspond or match the electrical property of the source and/or the ultrasound transducer, for example to impedance match the ultrasound transducer and the source, e.g. when the apparatus is in the first configuration. In the first configuration, the first adjustment system may be provided in, or switched into, an electrical conduction path between the source and the ultrasound transducer.

The apparatus may comprise a second adjustment system. The second adjustment system may be or comprise an impedance or impedance network, which may have a different impedance to the first adjustment system. The second adjustment system may be comprised in, or connectable or connected to the switch member. The second adjustment member may be configured to provide the electrical property of the apparatus so as to correspond or match the electrical property of the receiver and/or the ultrasound transducer, for example to impedance match the ultrasound transducer and the receiver, e.g. when the apparatus is in the second configuration. In the second configuration, the second adjustment system may be provided in, or switched into, an electrical conduction path between the ultrasound transducer and the receiver.

According to a sixth aspect of the present invention there is provided a system for use with an ultrasound transducer apparatus. The system may comprise an apparatus for interfacing with an ultrasound transducer. The apparatus may be or comprise an apparatus according to the fifth aspect.

The arrangement may comprise a source, e.g. a source for excitation of the ultrasound transducer. The source may be connected or connectable to the apparatus.

The arrangement may comprise a receiver for receiving, e.g. a receiver for receiving a signal from the ultrasound transducer. The receiver may be connectable or connected to the apparatus.

The source and the receiver may be connected or connectable to the ultrasound transceiver via the apparatus for interfacing with the ultrasound transducer.

According to a seventh aspect of the present invention there is provided an ultrasound transducer system. The system may comprise an ultrasound transducer apparatus according to the fourth aspect. The system may comprise a system for use with an ultrasound transducer apparatus according to the fifth aspect. The system for use with an ultrasound transducer apparatus may be connected or connectable to the ultrasound transducer.

According to an eighth aspect of the present invention there is provided a method of imaging an object. The object may be or comprise a dental structure, e.g. a tooth. The method may comprise positioning an ultrasound transducer relative to the object, e.g. to allow imaging of the object. The method may comprise or be comprised in non-destructive testing. The ultrasound transducer apparatus may be or comprise an ultrasound transducer according to the fourth aspect. The method may comprise using the ultrasound transducer to image the object.

The step of using may comprise directing one or more ultrasound wave(s) from the ultrasound transducer towards the object. The step of using may comprise receiving one or more ultrasound wave(s) reflected by the object or a portion thereof by the ultrasound transducer.

The method may comprise constructing and/or recording an image of the object based on the one or more ultrasound waves received from the object. The method may comprise constructing and/or recording an image of the object based on the one or more ultrasound waves received from one or more layers or interfaces between layers of the object, e.g. from interfaces between the enamel and the dentine and/or between the dentine and the pulp of a tooth.

The method may comprise focusing the ultrasound waves directed from the ultrasound transducer, e.g. by selectively applying a drive current or potential to selected second electrodes or electrical contacts or different drive currents or potentials to different second electrodes or electrical contacts and/or by providing a curved or non-planar transducer element, e.g. a concave transducer element.

It should be understood that the features defined above in accordance with any aspect of the present invention or below in relation to any specific embodiment of the invention may be utilised, either alone or in combination with any other defined feature, in any other aspect or embodiment of the invention.

BRIEF DESCRIPTION OF THE FIGURES

At least one embodiment of the invention will not be described, by way of example only, with reference to the accompanying drawings, in which.

DETAILED DESCRIPTION OF VARIOUS EMBODIMENTS

Figure 1:
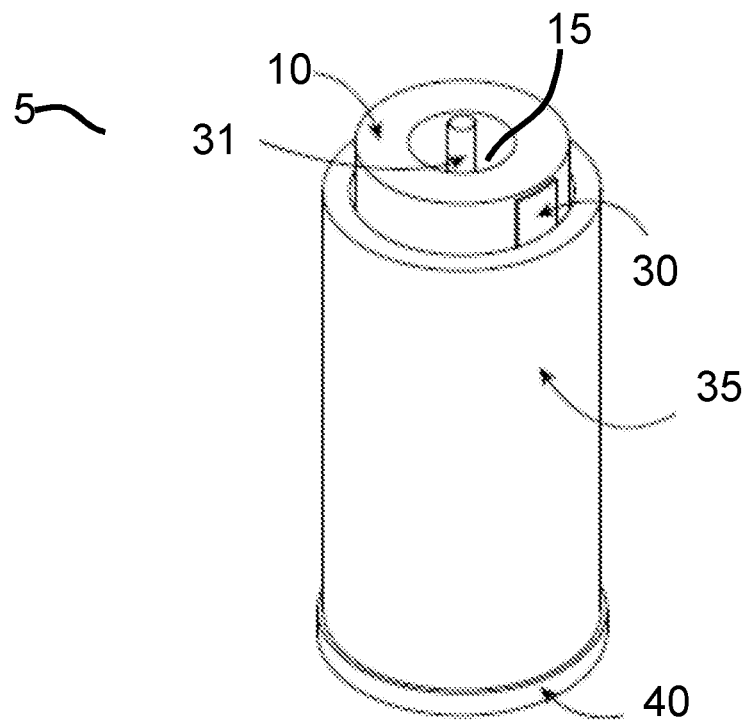
FIG. 1 shows a perspective view of an ultrasonic transducer.
Figure 2:
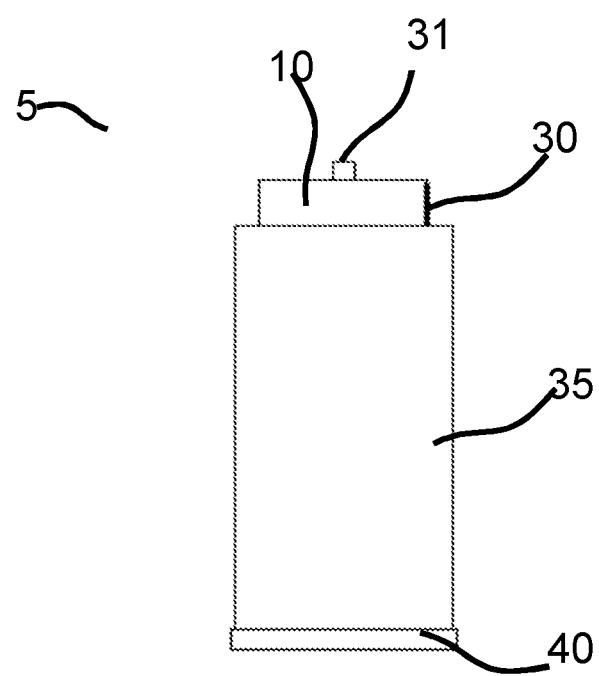
FIG. 2 shows a side view of the ultrasonic transducer of FIG. 1.
Figure 3:
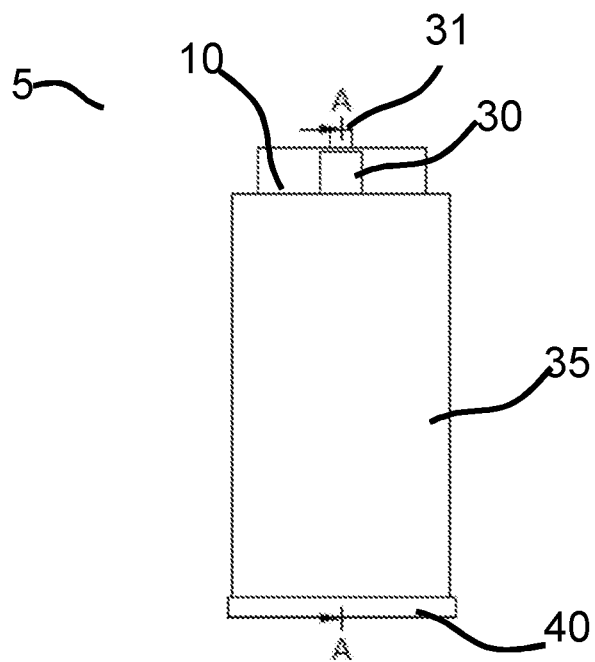
FIG. 3 shows view of another side of the ultrasonic transducer of FIGS. 1 and 2.
Figure 4:
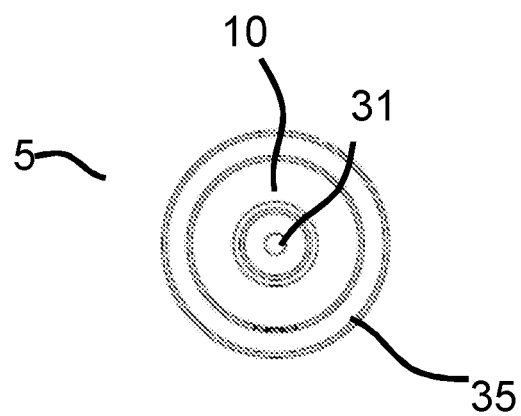
FIG. 4 shows a top sectional view of the ultrasonic transducer of FIGS. 1 to 3.
Figure 5:
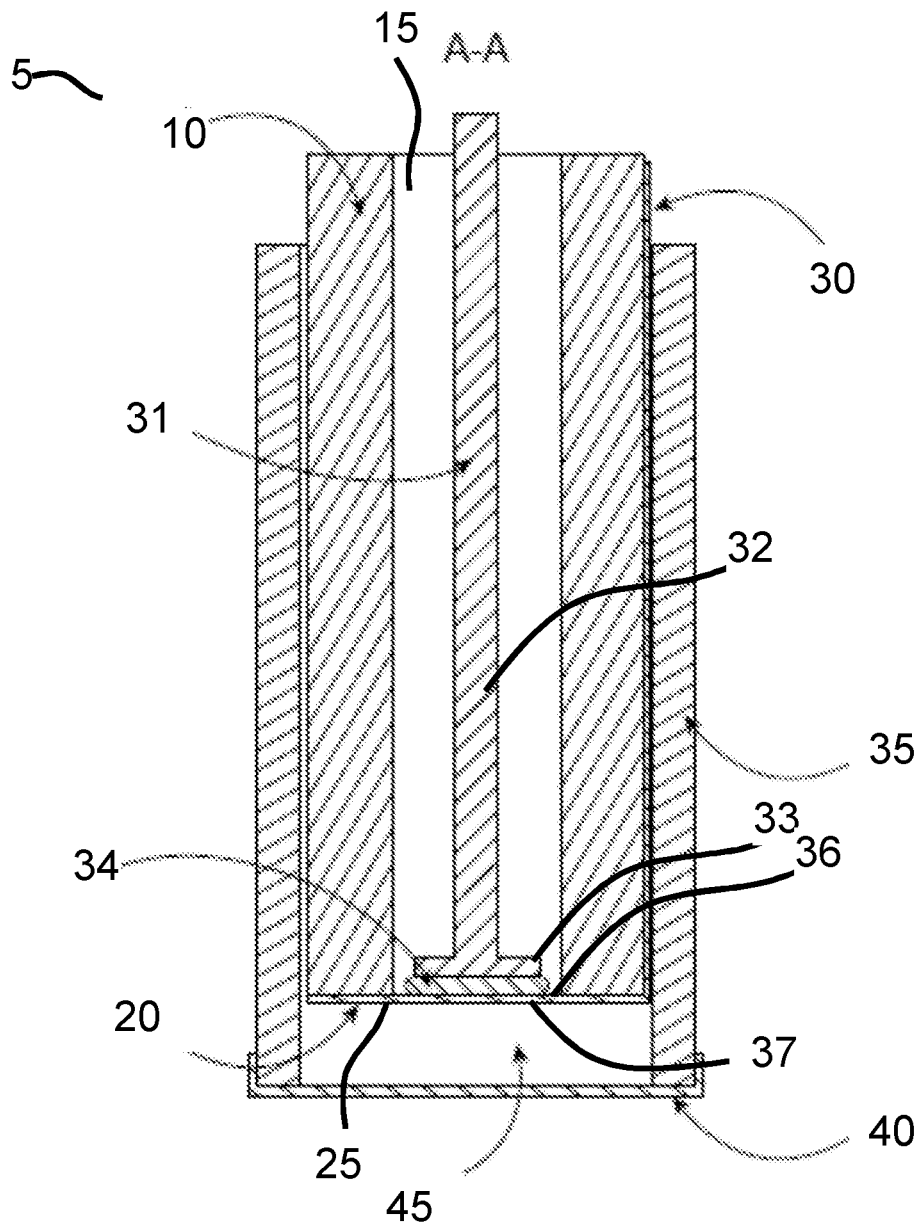
FIG. 5 shows a sectional view through the plane indicated A-A in FIG. 3.

Throughout the following description, identical reference numerals will be used to identify identical parts.

FIGS. 1 to 5 show an ultrasonic transducer 5 that comprises a support 10 in the form of a hollow member that defines a cavity 15, wherein the support 10 supports a transducer element 20. The transducer element 20 comprises an active portion 25 that is mounted on one end of the support 10 and extends over an opening in the cavity 15 so as to close the cavity 15 at one end. The transducer element 20 further comprises a connection portion 30 that extends from the active portion 25, along an outer surface of the support 10 to an end of the support 10 that is distal from the end of the support 10 that is provided with the active portion 25.

In the particular example shown in FIGS. 1 to 5, the support 10 is in the form of a hollow cylindrical tube formed from a ceramic material and the active portion 25 of the transducer element 20 is generally circular and sized to match the end of the support 10. The connection portion 30 is in the form of a tab extending from, and generally perpendicularly to, the active portion 25. The connection portion 30 functions as an electrode, e.g. ground electrode, of the transducer element 20. However, it will be appreciated that other arrangements, e.g. shape, size, and/or configuration, of support 10 and transducer element 20 are possible. For example, the support 10 could be in the form of a cuboid or box section or a polygonal prism or an oval prism and the active portion 25 of the transducer element 20 could be any other suitable shape or shape that corresponds to the end of the support 10 or the cavity therein, e.g. a square, rectangle, or other polygon or an oval.

The ultrasonic transducer 5 is provided with one or more pins 31 that are provided within the cavity 15. In the example of FIGS. 1 to 5, only a single pin 31 is provided but it will be appreciated that a plurality of pins 31, e.g. an array of pins 31, could be provided. The pins 31 are elongate and the long direction of the pins 31 extends generally in the longitudinal direction of the cavity 15 within the support 10. The pins 31 are preferably metallic (but need not be). In the present example, the pin 31 comprises a shaft 32 and a head 33, e.g. a flat head, wherein the head 33 extends generally perpendicularly to the shaft 32. The head 33 of the pin 31 is bonded to the active portion 25 of the transducer element 20 via an electrically conductive bond 34, which is formed, for example, by a conductive epoxy or other suitable adhesive or bonding agent. The pin 31 acts as electrode for the transducer element 20 and along with the electrode formed by the connection portion 30 act as an electrode pair to provide/receive a potential difference across the transducer element 20. The pin 31 also acts to provide additional damping of the active portion 25 of the transducer element 20.

Only discrete portions of the active portion 25 of the transducer element 20 are directly supported, in other words only some but not all of the area of the active portion 25 of the transducer element 20 is contacted by a supporting member, such as the end of the support 10 or by the one or more pins 31, and at least a portion, e.g. 10%, 30%, 55% or more, of the active portion 25 of the piezo electric element 20 is left uncontacted by either the support 10 or the pins 31 (albeit supported by a suitable support material such as a gel or resin, preferably an ultrasonically transparent gel or resin, provided in the cavity 15).

The active portion 25 of the transducer element 20 is provided with a piezoelectric material 36. In particular, the transducer element 20 is a composite, planar, layered thin film transducer element 20 formed from a layer of piezoelectric material 36 provided on a surface of an electrically conductive support layer 37. In a particularly preferred example, the layer of piezoelectric material 36 comprises a zinc oxide (ZnO) layer and the support layer 37 comprises an electrically conductive film or foil, preferably a metallic film or foil such as aluminium foil. The layer of piezoelectric material 36 provides the piezoelectric properties whilst the support layer 37 supports the thin layer of piezoelectric material 36 and modifies the resonance properties of the transducer element 20. The thin layer of piezoelectric material 36 is generally much thinner than the support layer 37. For example, the thin layer of piezoelectric material 36 can be between 2 and 20 μm thick and preferably between 2 and 8 μm thick, e.g. 4-6 μm thick. For example, the support layer 37 can be between 30 and 200 μm thick and preferably between 40 and 80 μm thick. By way of example, the support layer 37 could be between 2 and 20 times thicker, e.g. between 8 and 12 times thicker, than the layer of piezoelectric material 36. The layered thin film transducer element 20 can be formed by any suitable method for forming layered thin-film structures, but coating and particularly sputter coating the layer of piezoelectric material 36 onto the support layer 37 is preferred. In some embodiments, the ZnO is optionally crystalline, with a columnar structure and a preferred (002) orientation.

The transducer element 20 is arranged such that the piezoelectric material 36 is on an inner or cavity-ward side of the transducer element 20 relative to the support layer 37 and the support layer 37 is conversely outwardly of the piezoelectric material 36. In an exemplary arrangement, the piezoelectric material 37 is provided with a conductive coating such as a layer of chrome and/or a layer of gold to form a back electrode. In this way, electrical potentials can be applied to, or received from, the transducer element 20/piezoelectric material 36 via the pin 31 and the electrically conductive bond 34. In an alternative arrangement, the transducer element need not comprise the connection portion 30 and instead another form of electric connection, e.g. a wire or conducting paint could be used to provide a conductive pathway between the conductive support layer 37 and the ground or reference voltage.

The support 10 and the transducer element 20 are optionally provided inside a hollow delay line housing 35. The hollow delay line housing 35 is closed at one end by a flexible membrane 40. The membrane 40 is spaced apart from and faces the active portion 25 of the transducer element 20 such that a delay line chamber 45 is defined by the membrane 40, part of inner walls of the hollow delay line housing 35 and the active portion 25 of the transducer element 20. The delay line chamber 45 can be filled with a gel or other suitable material for delaying or slowing propagation of ultrasonic waves therethrough so as to function as a delay line. The delay properties of the delay line are selectable or may optionally be variable in use, e.g. by varying the dimensions of the delay line chamber 45, particularly the spacing between the active portion 25 of the transducer element 20 and the membrane 40 and/or the type, density, pressure or other property of the gel or other material provided within the delay line chamber 45. The support 10 and the transducer element 20 are optionally slidably, movably and/or removably mounted within the hollow delay line housing 35 or in other embodiments may be fixed within the hollow delay line housing 35. The delay line arrangement described above advantageously allows easier separation of transmitted and received signals but it will be appreciated that it is not essential.

Figures 6A, 6B, 6C:
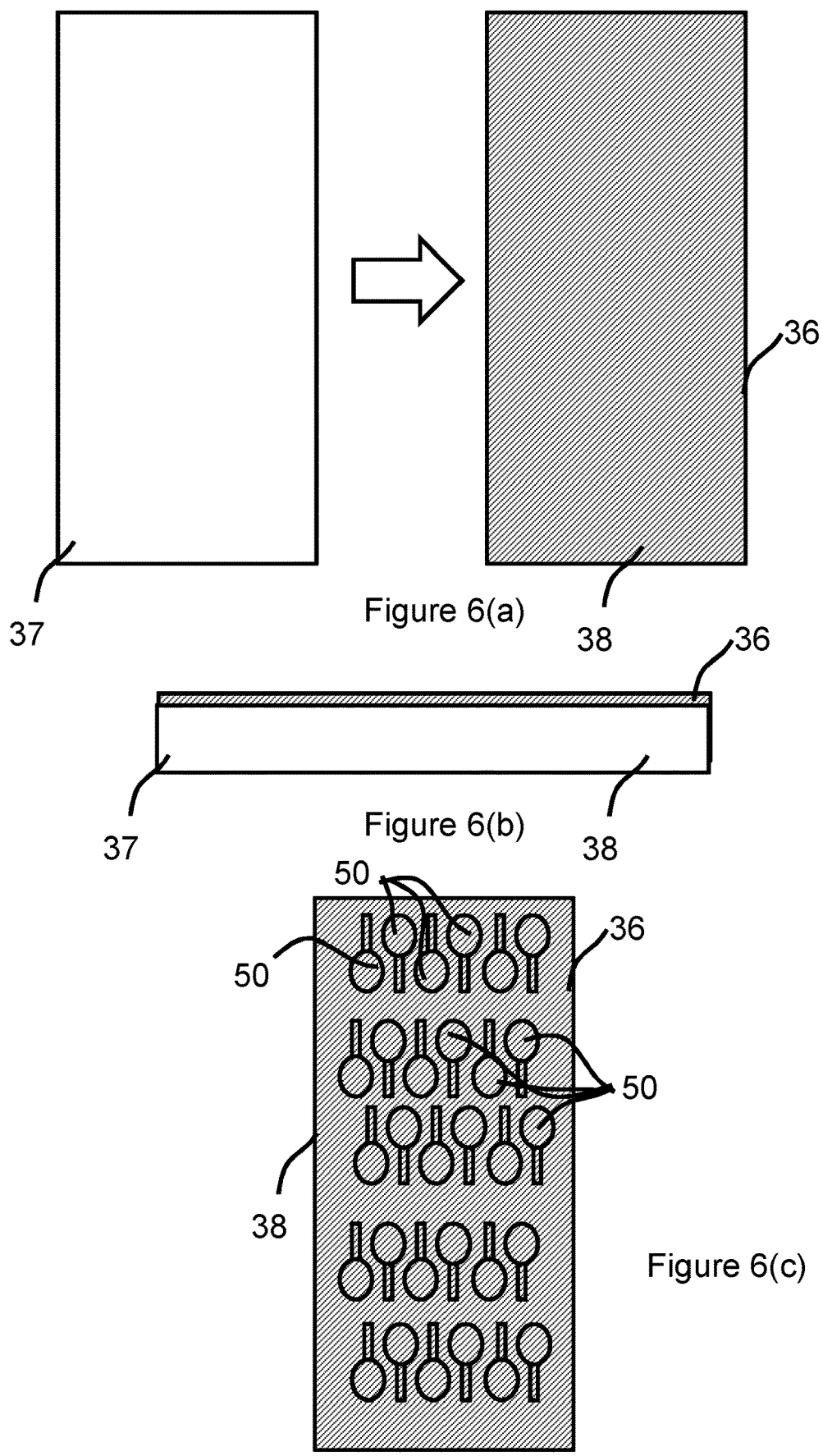
FIGS. 6(a) to 6(d) show production of a blank for forming a transducer element of the ultrasonic transducer of FIGS. 1 to 5.
Figure 6D:
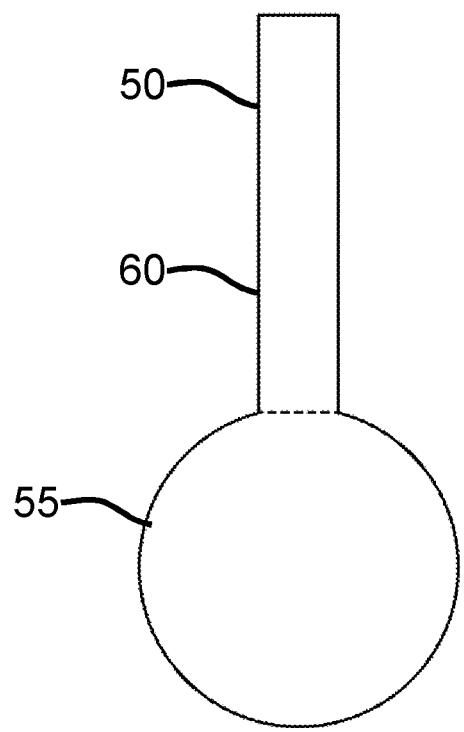
Figure 7:
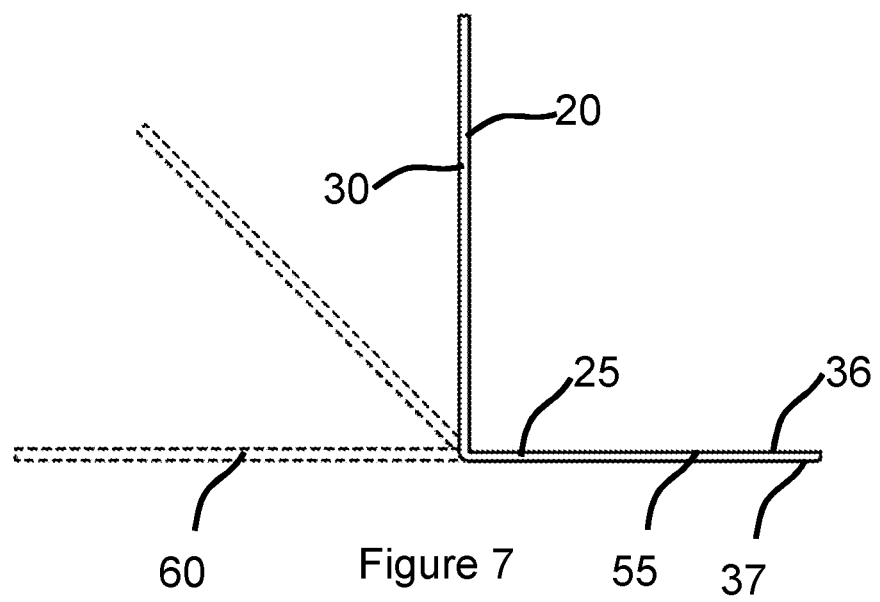
FIG. 7 shows formation of the transducer element from the blank of FIG. 6.
Figure 8:
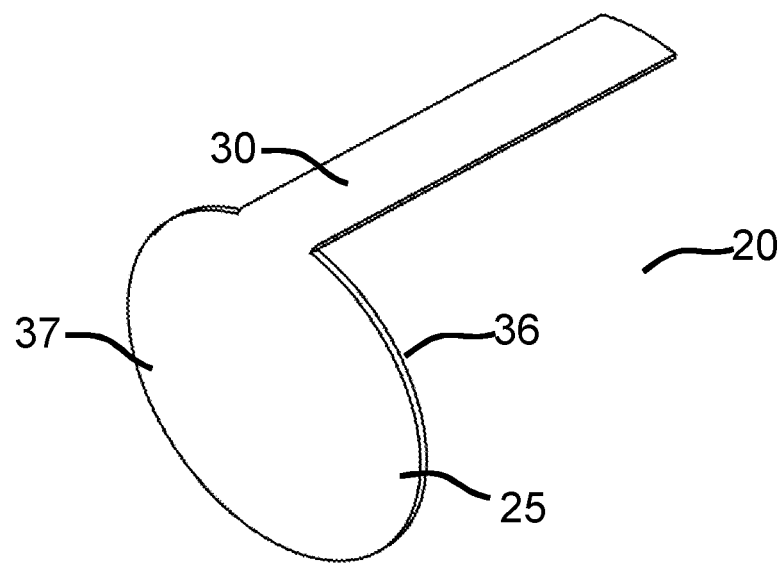
FIG. 8 shows a perspective the transducer element formed from the blank of FIG. 6.
Figure 9:
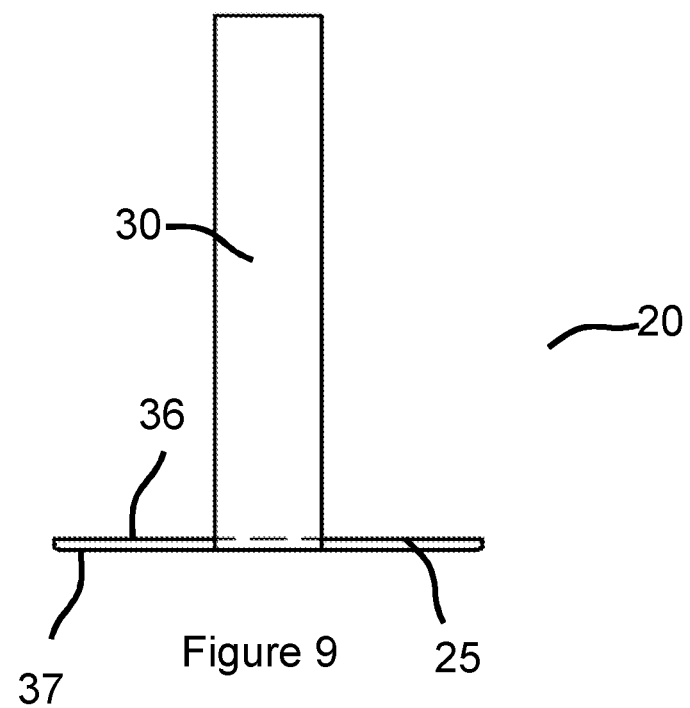
FIG. 9 shows a side view of the transducer element of FIG. 8.

As shown in FIG. 6(*a*), the transducer element 20 can be formed by coating the piezoelectric material 36 (e.g. the ZnO) onto a surface of the conductive support layer 37 (e.g. the aluminium foil) for example by sputter coating or other suitable coating technique to form a layered sheet or roll 38. The piezoelectric material 36 forms a thin film on the substrate 37, as shown in FIG. 6(*b*), which shows a side profile view of the layered sheet or roll 38. Thereafter, a blank 50 of the support layer 37 coated in the piezoelectric material 36 can be cut or punched out, as shown in FIGS. 6(*c*) and 6(*d*), wherein FIG. 6(*c*) shows the cut blanks 50 in the sheet or roll 38, whereas FIG. 6(*d*) shows an individual blank 50 once it has been separated from the sheet or roll 38. The blank 50 comprises a part 55 that will become the active portion 25 and a tab part 60 that will become the connection portion 30. As shown in FIG. 7, the tab part 60 can be bent relative to the part 55 that will become the active portion 25 so as to be angled or generally perpendicular thereto, e.g. as shown in FIGS. 8 and 9.

In this way, it will be appreciated that a plurality of blanks 50 may be produced using only a single piezoelectric material 36 deposition process or step. Since, the blanks 50 can then be formed into transducer elements 20, many transducer elements 20 can be formed from a single sheet or roll 38 using a single piezoelectric material 36 deposition process or step. Furthermore the above method using sheets or rolls allows for low cost, mass manufacturing techniques to be used. This makes the transducers 5 cheaper, quicker and easier to mass manufacture.

Figure 10:
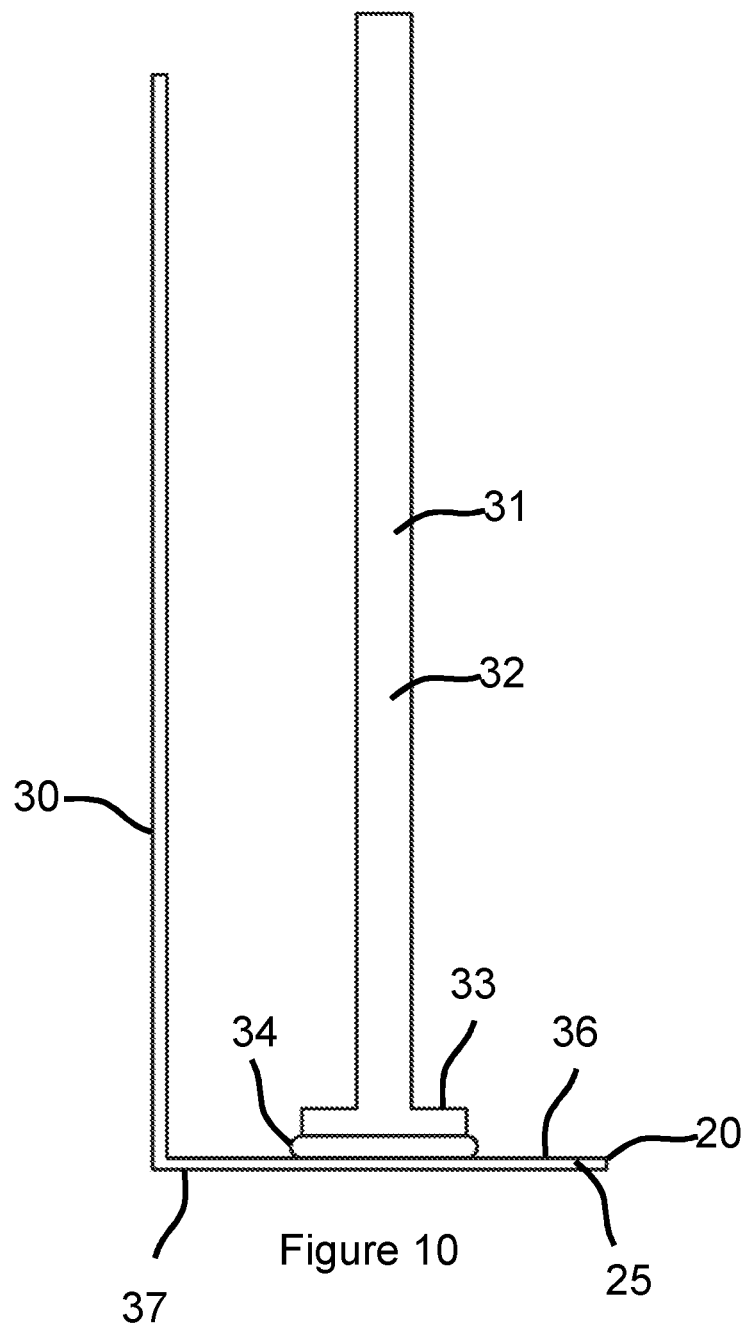
FIG. 10 shows an assembly comprising a pin and the transducer element of FIGS. 8 and 9 for use in the ultrasonic transducer of FIGS. 1 to 5.
Figure 11:
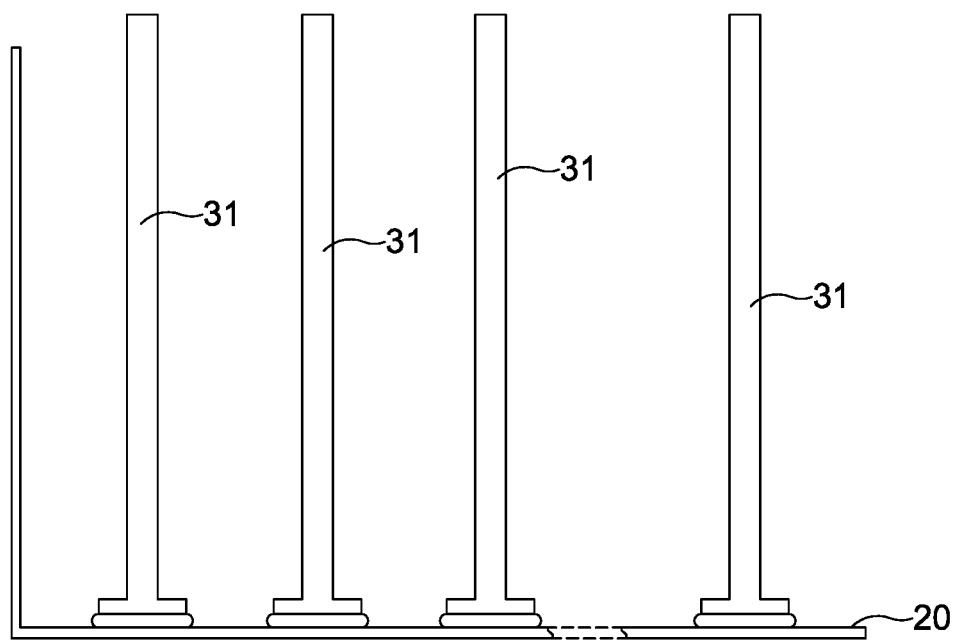
FIG. 11 shows an alternative assembly comprising a plurality of pins and the transducer element of FIGS. 8 and 9.

The head 33 of the pin 31 is bonded to the part 55 that will become the active portion 25 using the bond 34 (e.g. the conductive epoxy), as shown in FIG. 10. Although the embodiment of the ultrasonic transducer 5 shown in FIGS. 1 to 10 has only a single pin 31, in alternative embodiments, it will be appreciated that multiple pins 31 could be provided. In this case, as shown in FIG. 11, each pin 31 is spaced apart from the other pins 31 and bonded to the piezoelectric material 36 of the active portion 25 of the transducer element 20 via a conductive bond 34. Some of the area of the active portion 25 is contacted or directly supported by the pins 31 or the support 10, whilst some of the area of the active portion 25 between the pins 31 and the support 10 is left floating or free. In an optional embodiment, the volume around part of the pins 31 and bounded by the piezoelectric material 36 is optionally provided with a flexible, deformable and/or pliant material (e.g. a dielectric).

The active portion 25 of the transducer element 20 is positioned on the end of the ceramic support 10 and bonded to the support. For example, the piezoelectric material 36 or a coating provided thereon, is bonded to the end of the support 10, and the connection portion 30 placed so that extends upwardly, adjacent the outer side surface of the support 10.

The membrane 40 is bonded to an end of the delay line housing 35 and the gel is provided in the delay line chamber 45. At least part or all of the support 10 and transducer element 20 assembly is then provided into the delay line chamber 45 in the delay line housing 35 such that the active portion 25 of the transducer element 20 faces but is spaced apart from the membrane 40 to thereby form the transducer element 20.

Figure 12:
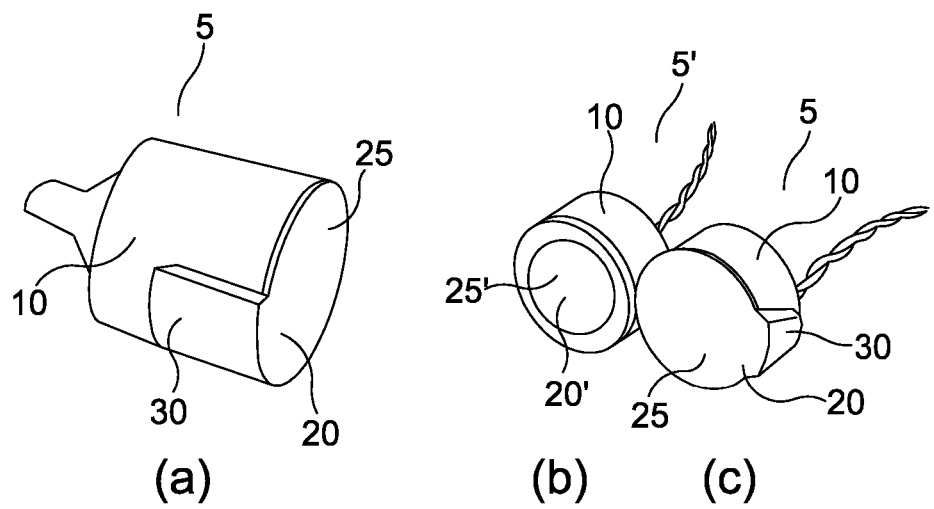
FIG. 12(a) shows a perspective view of the ultrasonic transducer of FIGS. 1 to 5.
FIG. 12(b) shows a perspective front view of an alternative ultrasonic transducer.
FIG. 12(c) shows a perspective front view of the ultrasonic transducer of FIGS. 1 to 5.

Further variations of the transducer element 20, 20' of the transducer 5, 5' are possible. For example, a transducer element 20 having a flat active portion 25 is shown in FIGS. 12(a) and 12(c). However, it will be appreciated that a transducer element 20' having a curved or concave active portion 25' could be provided instead, as shown in FIG. 12(b). The curvature of the active portion 25' in this case focuses the ultrasonic waves produced by the transducer 5, which is particularly useful for depth imaging and other such analyses, such as analysing the layers or structure of teeth or other dental imaging. An array of pins 31 can provide additional support to help hold the active portion 25' in the curved configuration. Optionally, some epoxy or conductive epoxy or other suitable material can be provided on the active portion 25' in order to maintain the curved or concave shaped active portion 25'.

The curved or concave shape can be formed during manufacturing, e.g. by using a curved former such as a ball or bearing to form the curved shape, which can optionally be maintained by providing supporting material such as the epoxy within the cavity 15 and the former then removed to leave the curved or concave active portion 25'. Whilst this arrangement advantageously provides a focused beam, other shapes or geometries of active portion 25' could be considered, e.g. convex for applications requiring a highly dispersive or diverging ultrasonic waves.

Figure 13:
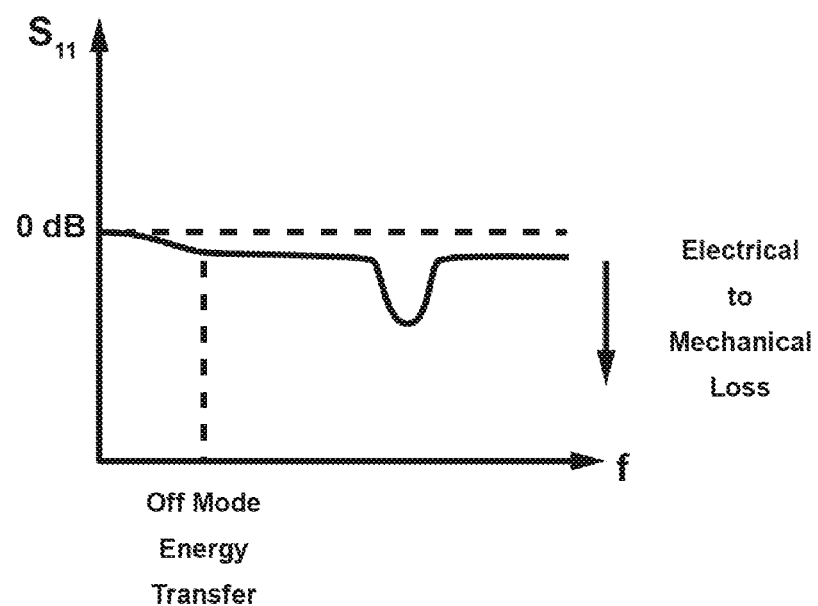
FIG. 13 shows the variation of losses with frequency for the ultrasonic transducer of FIGS. 1 to 5.
Figure 14:
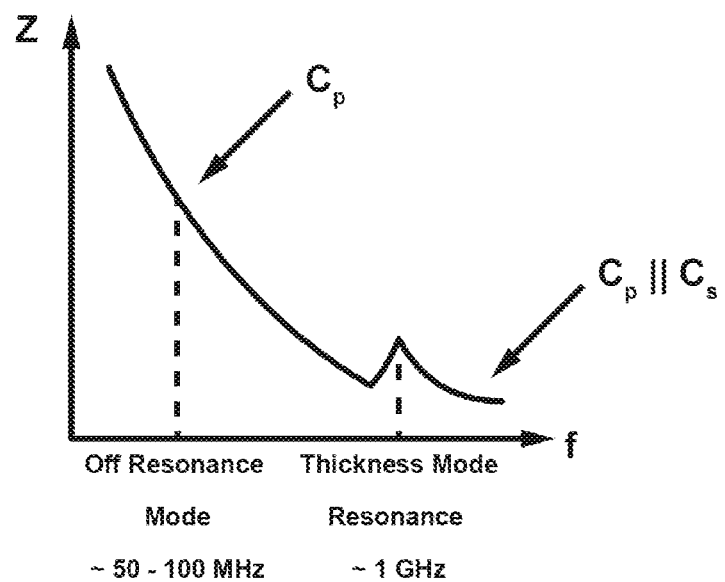
FIG. 14 shows the variation of impedance with frequency for the ultrasonic transducer of FIGS. 1 to 5.

The variation of losses with frequency is shown in FIG. 13. It can be seen form this that minimum losses are obtained at the resonant frequency of the active portion 25 of the transducer element 20. However, since the active portion 25 of the transducer element 20 is a very thin film, this resonant frequency tends to be higher than that required for many applications, such as dental and other medical imaging. For example, the resonant frequency due to the thickness of piezoelectric material 36 can be from 200 MHz to GHz levels, whereas lower frequencies, such as between 0.001 to 200 MHz, such as between 20 to 100 MHz, e.g. 40 to 120 MHz are preferred for many medical imaging applications, particularly dental imaging for imaging teeth. Frequencies ranging from 1 to 10 MHz may be preferred, for example, in NDT application. As can be seen from FIG. 14, impedance of the thin film transducer 5 at these useful "off-resonance" frequencies can be significantly higher than at resonant frequencies.

Figure 15:
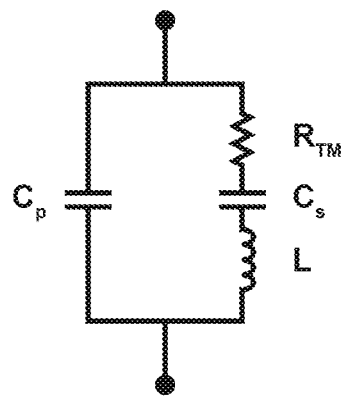
FIG. 15 shows an equivalent circuit for the ultrasonic transducer of FIGS. 1 to 5 when operated at a resonance frequency associated with the thickness of a piezoelectric coating of the transducer element.
Figure 16:
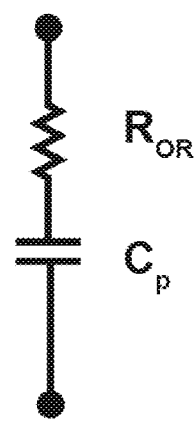
FIG. 16 shows an equivalent circuit for the ultrasonic transducer of FIGS. 1 to 5 when operated "off resonance" at a frequency other than a resonance frequency associated with the thickness of a piezoelectric coating of the transducer element.

This can be explained by the equivalent circuit for the ultrasonic transducer 5 when operated at the resonant frequency (so called thickness mode), as shown in FIG. 15, is compared with the equivalent circuit for operation off-resonance, as shown in FIG. 16. When off-resonance, the ultrasonic transducer 5 is generally equivalent to a capacitance ($C_p$) in series with an off-resonance resistance ($R_{OR}$), as shown in FIG. 16. However, when used at a resonant frequency of the transducer element 20, the ultrasonic transducer 5 operates more similarly to the capacitance $C_p$ from the "off-resonance" case in parallel with another capacitance $C_S$ that is in turn n series with a thickness mode resistance $R_{TM}$ and an inductance L, as shown in FIG. 15. As can be seen from FIGS. 13 and 14, operation at a resonant frequency of the transducer element 20 results in lower losses. Operation at the frequencies that are most beneficial for dental imaging, e.g. around 40-120 MHz, results in a very high impedance relative to operation at a resonant frequency. The mechanical and electric transfer for the ultrasonic transducer 5 at resonance is much more efficient than when operation is off-resonance. One way to address this could be to operate the transducer 5 using a high slew rate circuit.

With the construction of the transducer element 20 described above, the $n\lambda/2$ resonances of the support layer 37 (e.g. the aluminium foil) have a dominant effect, and the operating frequency corresponds to the first and second overtones contributed by $\lambda/2$ resonance in the support layer 37. The resonant frequency of the transducer element is thus influenced by factors such as the thickness of the support layer 37 and to some extent by the thickness of the piezoelectric material 36 that is coated onto the support layer 37. However, other considerations such as durability, processability and ease of construction also affect the choice of thicknesses for these components, so it can often be the case that it is necessary to use the transducer element 20 "off resonance", i.e. not in the region of a resonant frequency of the transducer element 20, particularly for certain medical imaging applications, preferably dental imaging, where the ideal operating frequencies are generally in the range from 40 to 120 MHz, whereas the resonant frequencies of the transducer element 20 are generally in the range of 400 MHz to 1 GHz (See FIG. 14).

Figure 17:
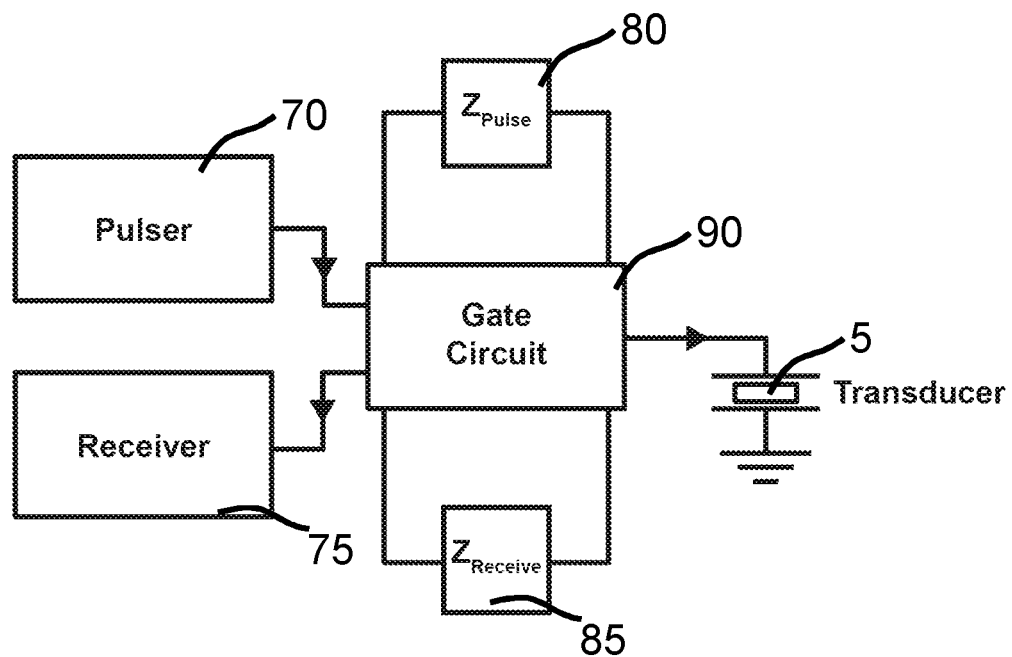
FIG. 17 shows a schematic diagram of an operating circuit for operating an ultrasonic transducer, such as that of FIGS. 1 to 5.

In order to improve operation of the ultrasonic transducer 5 in many applications such as certain medical applications and particularly in dental applications that require operation "off-resonance", the ultrasonic transducer is used with a control system 65 as shown in FIG. 17. The control system 65 comprises a pulser unit 70 for providing a pulser signal for operating the ultrasonic transducer 5 to transmit an ultrasonic pulse. The control system 65 further comprises a receiver 75 for processing the signals generated by the ultrasonic transducer 5 responsive to, and representative of, ultrasonic signals received by the ultrasonic transducer 5.

Transmitting and receiving the signals with optimal impedance matching is beneficial. However, conventional impedance matching approaches may be ineffective in the present case as the optimum impedance matching requirements for the pulser 70 are generally very different to those required by the receiver 75. As such, simply matching the impedance at the interface to the ultrasonic transducer 5 would result in sub-optimal matching during transmission and/or reception.

The control system 65 comprises two different impedance systems 80, 85, the first impedance system 80 being optimally impedance matched for the pulser 70, whilst the second impedance system 85 is optimally impedance matched for the receiver 75. As the impedance requirements for the pulser 70 and receiver 75 are different, it will be appreciated that the impedance systems 80, 85 have different total impedances to each other. The impedance systems 80, 85 are both coupled to a gate circuit 90, the gate circuit 90 in turn being coupled to the pulser 70, the receiver 75 and the ultrasonic transducer 5. The gate circuit 90 is operable to switch between a first configuration in which the first impedance system 80 is switched into an electrical path between the ultrasonic transducer 5 and the pulser 70 via the gate circuit 90 and a second configuration in which the second impedance system 85 is switched into the electrical path between the ultrasonic transducer 5 and the receiver 75 via the gate circuit 90 depending on whether or not the ultrasonic transducer 5 is transmitting or receiving respectively.

The gate circuit 90 is preferably passive, and acts to determine the direction of signals, i.e. transmitting or receiving and switch in the appropriate impedance system 80, 85 as outlined above. In this way, the appropriate impedance matching is provided, regardless of the current operation of the ultrasonic transducer 5. This can provide very significant performance gains in applications such as dental imaging in which off-resonance operation can be preferred.

Although various particularly advantageous embodiments are described above, it will be appreciated that alternative arrangements could be used.

Figure 18:
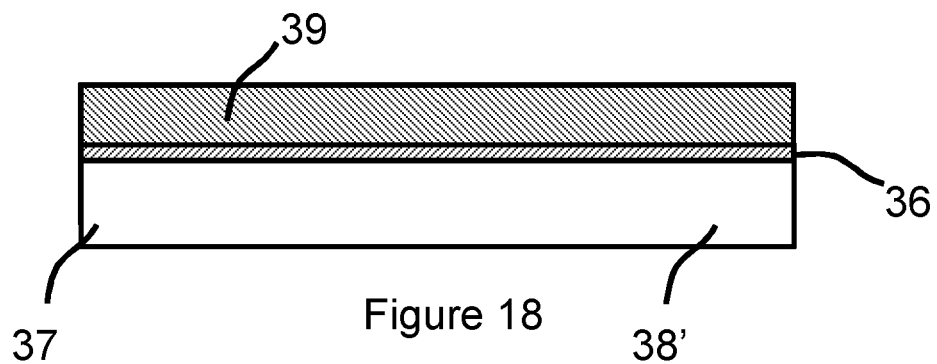
FIG. 18 shows an alternative blank for use in forming a transducer element of the ultrasonic transducer of FIGS. 1 to 5.

In an example, FIG. 18 shows an alternative to the construction shown in FIGS. 6(*a*) to 6(*d*). In particular, the arrangement shown in FIG. 18 is the same as that shown in FIG. 6(*b*) other than an additional layer of dielectric material 39 is deposited onto a surface of the piezoelectric material 36 that is opposite to the support layer 37. In the embodiment of FIG. 18, the transducer element 20 is formed by coating the piezoelectric material 36 (e.g. the ZnO) onto a surface of the conductive support layer 37 (e.g. the aluminium foil) for example by sputter coating or other suitable coating technique, and then the layer of dielectric material 39 is applied to the surface of the layer of piezoelectric material to form a layered sheet or roll 38'. Thereafter, a blank of the layered sheet or roll 38' can be cut or punched out in the manner shown in FIGS. 6(*c*) and 6(*d*), and subsequently used to form an ultrasonic transducer as described above, e.g. in relation to FIGS. 7 to 11. Alternatively, the dielectric material 39 may be applied after bonding the electrode(s) 31 to the piezoelectric material 36, which may save having to form openings through the dielectric material 39 in order to provide electrical contact between the electrode(s) 31 and the piezoelectric material 26.

Examples of suitable dielectric material 39 include polymeric materials, plastic materials, or epoxies such as SU8. The dielectric material has a thickness less than that of the piezoelectric material, e.g. <1 mm. The dielectric material has a high voltage density (i.e. it is an electrical insulator). Application of the dielectric material 39 in the manner described above can be beneficial, e.g. it can conveniently lower the frequency produced by the resultant ultrasonic transducer down to frequencies better suited for certain applications, such as non-destructive testing (NDT), which could be (but not limited to), for example, in the range from 1 to 10 MHz.

For example, although a thin-film ultrasonic transducer comprising ZnO deposited on an aluminium film are described, it will be appreciated that different piezoelectric materials such as aluminium nitride (AlN) and/or different substrates/support layers, such as films of different metals or conductive polymers, could be used.

In addition, although manufacturing techniques such as sputter coating are advantageously described, it will be appreciated that other alternative techniques could be used.

Furthermore, whilst exemplary thicknesses and thickness ratios are described above, it will be appreciated that different thicknesses and thickness ratios could be used depending on considerations such as the application, the materials, used, the manufacturing process used and the like.

Also, whilst various geometric arrangements, shapes and dimensions of various components are describes, it will appreciated that the invention need not be limited to these arrangements, shapes or dimensions.

As such, the above specific embodiments are simply provided as non-limiting examples to help the understanding of the invention but the scope of protections is governed by the claims.

The invention claimed is:

1. A method of producing an ultrasound transducer, the method comprising the steps of:
    providing a layered thin film transducer element, the transducer element comprising a piezoelectric material such that the piezoelectric material is a thin layer of non-polymeric inorganic material deposited on at least part of a substrate that is an electrically conductive flexible metallic foil, such that the piezoelectric material forms a coating of the piezoelectric material on the substrate; and
    connecting at least one elongate second electrode or electrical connection to at least a part of a surface of the transducer element such that a longitudinal direction of the second electrode or electrical connection extends in a direction substantially perpendicular or angled to a part of a surface of the piezoelectric material to which the second electrode or electrical connection is connected, and a total or combined surface area of regions of the one or more second electrodes or electrical connections that contact, couple or bond to, or support, the layered thin film transducer element is less than a surface area of the layered thin film transducer element.

2. The method of claim 1, wherein the method comprises producing the layered thin film transducer element by:
    providing or depositing the piezoelectric material on at least part of a surface of a sheet of the substrate to form a layered member; and forming the one or more piezoelectric ultrasound transducer elements from the layered member.

3. A method of assembling an ultrasound transducer, the method comprising the steps of:

providing a substrate and a piezoelectric material such that the piezoelectric material is a thin layer of non-polymeric inorganic material arranged or deposited on at least part of the substrate such that the piezoelectric material forms a coating of the piezoelectric material on the substrate, the substrate being configured or arranged to form a first electrode of the ultrasound transducer, the substrate being an electrically conductive flexible metallic foil; and connecting at least one elongate second electrode to at least a part of a surface of the piezoelectric material such that a longitudinal direction of the second electrode or electrical connection extends in a direction substantially perpendicular or angled to the part of the surface of the piezoelectric material to which the second electrode or electrical connection is connected, and a total or combined surface area of regions of the one or more second electrodes or electrical connections that contact, couple or bond to, or support, a transducer element is less than a surface area of the transducer element.

* * * * *